May 24, 1966  A. A. L. RAYMOND  3,252,677

CABLE FASTENER

Filed April 15, 1964  2 Sheets-Sheet 1

Inventor:
Alain Achille Louis Raymond,
by Gordon Needleman
Atty.

May 24, 1966  A. A. L. RAYMOND  3,252,677
CABLE FASTENER

Filed April 15, 1964  2 Sheets-Sheet 2

Inventor:
Alain Achille Louis Raymond,
by Gordon Needleman
Atty.

United States Patent Office 3,252,677
Patented May 24, 1966

3,252,677
CABLE FASTENER
Alain Achille Louis Raymond, Grenoble, France, assignor to A. Raymond, Grenoble, France, a firm
Filed Apr. 15, 1964, Ser. No. 359,931
Claims priority, application France, June 4, 1963, 936,934, Patent 1,366,886
1 Claim. (Cl. 248—68)

This invention relates generally to fastening devices and more specifically to tubing or wiring fasteners.

An object of the present invention is to provide a versatile method of engaging various apertured supports.

Another object of the present invention is to provide a fastening device having means of engaging an article or stacked articles to be held to a support.

A further object of the present invention is to provide a fastener for engaging elongated articles, such as cables, tubes, pipes, etc., to an apertured support.

Other objects of the invention will, in part, be obvious and will, in part, appear hereinafter.

The fastener disclosed herein consists essentially of a flexible plate which has cylindrical foot extending from one side. The foot is equipped with a series of integral, annular thin edge, rings designed to assure the fastening of the fastener to an apertured support. An anchoring rod extends from the opposite side of the plate. The rod has means associated with it for holding cables or other objects along side of the rod. The present fastener may be of unitary construction; and there are numerous plastic materials, such as nylon, which may be utilized in forming it. The fastener may be engaged to apertured supports of varying thicknesses. The rings assure the anchoring either by buttressing on the internal surface of the hole in the case of thick walls or by support behind the wall when the latter is thin, constituted, for example, by a panel.

In the drawings:

FIG. 1 is a side elevation of the fastener showing the plate in section and the objects to be held and the stirrups dotted in;

FIG. 2 is a top plan view of the fastener shown in FIG. 1 with a pair of wires or conduits dotted in;

Figure 1:
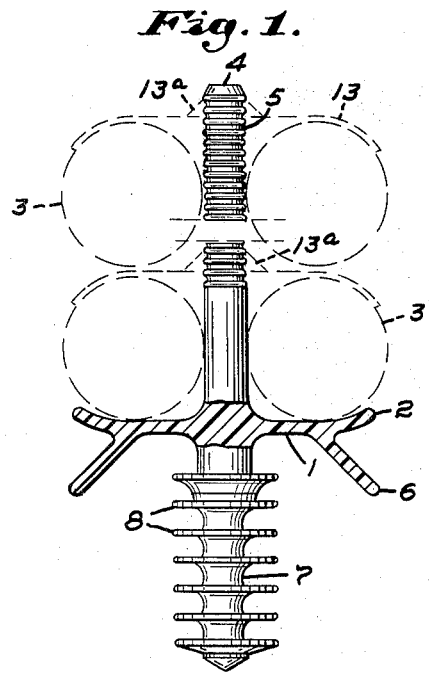
Figure 2:
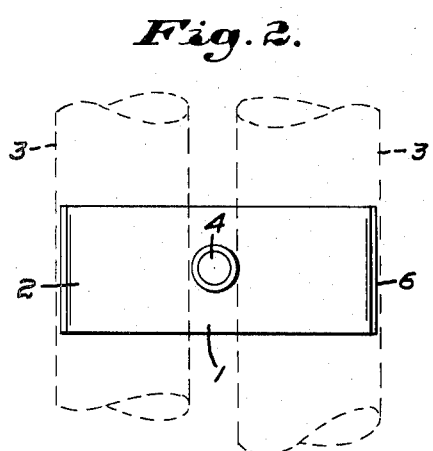
Figure 4:
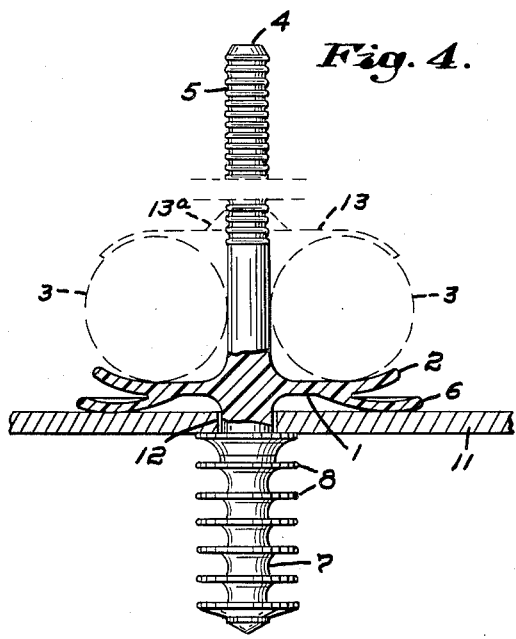
FIG. 4 is a side elevation partly in section of the fastener assembly shown in FIG. 1 engaged in a thin support.

In the drawing and particularly in FIGS. 1, 2 and 4 there is shown a fastener having a plate 1, for example, with a rectangular form which could be round, oval, etc., if desired. Two opposed sides or first flanges 2 are raised, for example, incurved, to laterally maintain conduits 3 or the like placed on the plate 1. A rod 4 extends from one side of the plate 1, in integral right angle relationship therewith. A series of peripheral grooves 5 are formed on the rod 4 from the terminal end thereof to a predetermined horizontal plane between the terminal end and the plate 1.

Support clamps or second flanges 6 extend from the undersurface of the plate 1 in a direction opposite to the rod 4 and spaced from the side 2. A cylindrical foot 7 extends from the opposite side of the plate 1 from the rod and has an axis coincident with the rod 4. The support clamps 6 are spaced from the foot 7 as shown in FIG. 1. The foot 7 extends beyond the horizontal plane of the edges of the clamps 6.

The foot 7 has one or more flexible rings 8 with thin edges extending annularly therefrom as shown in FIG. 1. Each of the rings 8 are spaced equidistant from the one next to it and each has the same diameter.

The fastener can be attached to a support in three different ways depending on whether the support is thick, thin or average thickness.

In the first case a support similar to support 9 has a hole similar to hole 10 of less diameter than the rings 8 formed therein. A hole similar to the hole 10, in this case, will have a depth greater than the length of the foot 7. When the foot 7 is driven into the hole 10, the rings 8 flex upwardly and assure the anchoring of the fastener by a frictional engagement aided by the tension created by the flexing. The clamps 6 co-operate with the rings 8 to secure the fastener.

In the case of a thin panel 11, the foot 7 can be driven into the hole 12 until all the rings 8 have passed therethrough. The fastener is held to the panel 11 on the one hand by the engagement of the ring 8, closest to the plate 1, against the undersurface of the panel 11 adjacent the hole 12 and on the other hand by the abutting engagement of the clamps 6 against the upper surface of the panel 11 as shown in FIG. 4.

For a wall (not shown) of average thickness, the two methods of fastening can operate at the same time. That is, some of the edges of the rings 8 will engage against the wall of the aperture formed in the support and another of the rings 8 will engage against the undersurface of the support similar to the engagement shown in FIG. 4.

The cables, tubes or other objects 3 are placed on the fastener along the support 11 on both sides of the rod 4, in a direction essentially parallel to the plane of the longest dimension of the plate 1 as indicated in FIG. 1. The cables 3 are retained on the one hand by the raised sides 2 and, on the other hand by stirrups 13 engaged on the rods 4 by an integral ratchet plate 13a on the grooves 5, as indicated in FIG. 1. Several series of cables or other objects 3 could also be superimposed as indicated in FIGS. 1 and 4.

Figure 3:
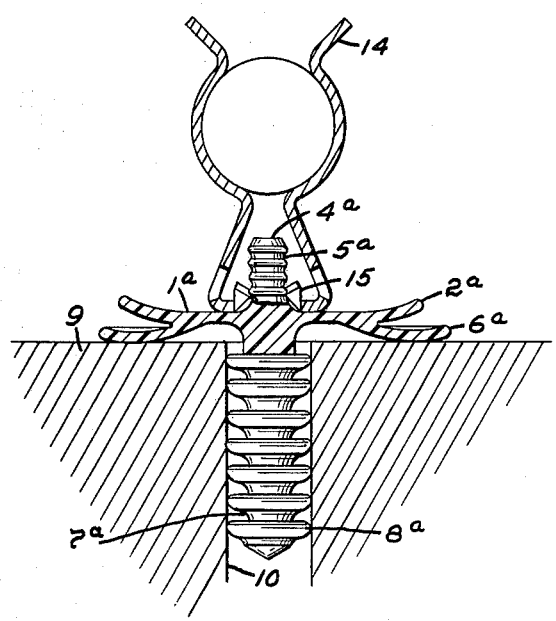
FIG. 3 is a side elevation partly in section of a variation of the fastener shown in FIG. 1 engaged in a thick support.

The cables 3 could also be maintained in place by a clamp 14 in the form of a buttressed lyre engaged with the grooves 5 by integral tongues 15 as shown in FIG. 3. In this variant the rod 4a is formed having less length than the rod 4. In FIG. 3 the parts similar to those shown in FIGS. 1, 2 and 4 are shown with like numbers having the prefix a added.

Figure 5:
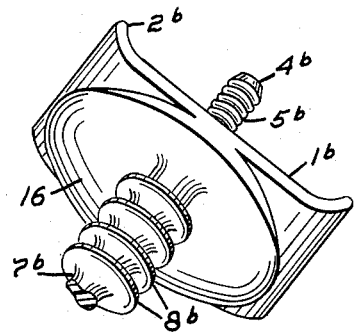
FIG. 5 is a view in perspective of another variant of the fastener shown in FIG. 1.
Figure 6:
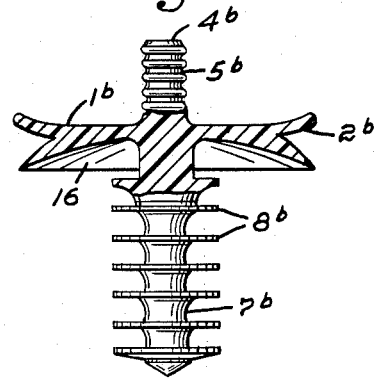
FIG. 6 is a side elevation partly in section of the fastener shown in FIG. 5.

In the variant represented in FIGS. 5 and 6 the plate 1b is provided with an elastic flange 16 in the form of a meniscus or truncated cone, which replaces the clamps 6 and allows not only enclosing the variation in the thicknesses to be tightened, but also assures a water-tight fit around the hole into which is inserted the foot 7b. In FIGS. 5 and 6 the parts similar to those shown in FIGS. 1, 2 and 4 are shown with like numbers having a prefix b added.

While there has been illustrated and described a preferred embodiment of the invention, it should be understood that the invention is best described by the following claim.

I claim:

A flexible fastening device comprising a cylindrical rod having free terminal ends, a plate portion integral with and extending from said rod between said terminal ends, said plate portion having integral first flange members in opposed relation to each other and integral second flange members extending therefrom in opposed relation to each other, said first and second flange members being spaced from each other, said plate portion dividing said rod into an upper and lower portion, each of said first flange members being spaced from its respective second flange member, said first flange members being arced upwardly from said plate portion in a direction away from said second flange members, said upper portion of said rod having a series of angular ribs extending therefrom and spaced from each other to provide circumferential channels for engagement with a fastening element, and said lower portion having means for engaging an apertured support.

References Cited by the Examiner

UNITED STATES PATENTS

| | | | |
|---|---|---|---|
| 1,126,531 | 1/1915 | Liebmann | 85—42 X |
| 1,743,493 | 1/1930 | Sipe | 16—121 |
| 2,531,049 | 11/1950 | Huck | 85—5 |
| 2,557,370 | 6/1951 | Bussmann | 248—71 |
| 2,795,834 | 6/1957 | Szoke | 24—257 |
| 3,066,902 | 12/1962 | Conil | 248—223 |
| 3,066,903 | 12/1962 | Finnerman | 248—300 |

FOREIGN PATENTS

| | | |
|---|---|---|
| 226,656 | 8/1958 | Australia. |
| 1,099,326 | 3/1955 | France. |
| 1,317,354 | 1/1963 | France. |
| 1,106,122 | 5/1961 | Germany. |
| 30,072 | 12/1910 | Great Britain. |
| 893,448 | 4/1962 | Great Britain. |

CLAUDE A. LE ROY, *Primary Examiner.*